United States Patent [19]
Arhancet

[11] Patent Number: 5,951,748
[45] Date of Patent: Sep. 14, 1999

[54] COMPOSITIONS AND METHODS FOR INHIBITING FOULING OF VINYL MONOMERS

[75] Inventor: Graciela B. Arhancet, Katy, Tex.

[73] Assignee: BetzDearborn Inc., Trevose, Pa.

[21] Appl. No.: 09/124,296

[22] Filed: Jul. 29, 1998

Related U.S. Application Data

[62] Division of application No. 08/844,862, Apr. 22, 1997, Pat. No. 5,858,176.

[51] Int. Cl.$^6$ .................................................. A01N 57/10
[52] U.S. Cl. ................................. 106/18.31; 106/15.05; 424/78.09; 514/75; 514/99; 514/101; 514/141; 523/122
[58] Field of Search .............................. 106/15.05, 18.31; 558/85, 214; 570/103, 222, 262; 514/75, 99, 101, 141; 424/78.09; 523/122

[56] References Cited

U.S. PATENT DOCUMENTS

| | | | |
|---|---|---|---|
| 3,141,032 | 7/1964 | Friedman | 558/77 |
| 3,271,295 | 9/1966 | Gonzalez | 208/48 AA |
| 4,578,178 | 3/1986 | Forester | 208/48 AA |
| 4,775,458 | 10/1988 | Forester | 208/48 AA |
| 4,828,674 | 5/1989 | Forester | 208/48 AA |
| 4,972,561 | 5/1990 | Forester | 252/389.22 |
| 5,023,001 | 6/1991 | Amjad et al. | 210/699 |
| 5,059,335 | 10/1991 | Rizvi et al. | 508/293 |
| 5,171,420 | 12/1992 | Forester | 208/48 AA |
| 5,171,421 | 12/1992 | Forester | 208/48 AA |
| 5,171,466 | 12/1992 | Korosec | 508/188 |
| 5,240,469 | 8/1993 | Poindexter et al. | 44/392 |
| 5,241,003 | 8/1993 | Degonia et al. | 525/123 |
| 5,324,393 | 6/1994 | Poindexter | 203/6 |
| 5,342,505 | 8/1994 | Forester | 208/48 AA |
| 5,362,898 | 11/1994 | Telschow | 558/79 |
| 5,614,081 | 3/1997 | Carey et al. | 208/47 AA |

OTHER PUBLICATIONS

Chem. Abstr. 97:72,589Z, "Diphospaspiro Compounds", p. 656, No Date.
Chem. Abstr. 89: 111,404S, "Hydrogen Phosphonates", p. 81, No Date.
Chem. Abstr. 85: 21,557g, "Organic Phosphorous Compounds. 69. Synthesis and Properties of Cyclic Phosphonate and Thiophosphonate Esters", p. 712, No Date.
WPIDS Abstract No. 70–58938R, abstract of Soviet Union Patent Specification No. 254768, Aug. 1970.
WPIDS Abstract No. 74–63905V, abstract of Japanese Patent Specification No. 49–030456, Aug. 1974.
WPIDS Abstract No. 75–00744W, abstract of Japanese Patent Specification No. 49–045140, Dec. 1974.

*Primary Examiner*—Anthony Green
*Attorney, Agent, or Firm*—Philip H. VonNeida

[57] ABSTRACT

Methods and compositions for inhibiting fouling in vinyl monomers are disclosed. Alkylphosphonate esters or acids thereof are added to vinyl monomers, particularly ethylene dichloride, that are undergoing processing to inhibit fouling.

7 Claims, No Drawings

COMPOSITIONS AND METHODS FOR INHIBITING FOULING OF VINYL MONOMERS

This is a divisional of application Ser. No. 08/844,862 filed Apr. 22, 1997, now U.S. Pat. No. 5,858,176.

FIELD OF THE INVENTION

The present invention relates to compositions and methods for inhibiting fouling of vinyl monomers during their processing. More particularly, the present invention relates to compositions and methods for inhibiting the fouling of chlorinated hydrocarbons utilizing an alkylphosphonate ester or acid thereof.

BACKGROUND OF THE INVENTION

During the petrochemical processing of chlorinated hydrocarbons, they are commonly heated to temperatures of 38° C. to 815° C. This processing typically comprises production and purification processes such as distillation and fractionation. Ethylene dichloride (EDC) is most commonly used in the production of vinyl chloride monomer (VCM).

Ethylene dichloride, also known as 1,2-dichlorethane, is produced from ethylene by two different processes: the direct chlorination of ethylene and the oxychlorination of ethylene. Direct chlorination uses ferric chloride, tetrachloroferrate salts, aluminum chloride or cupric chloride as catalysts.

Oxychlorination of ethylene is typically incorporated into an integrated vinyl chloride plant in which hydrogen chloride, recovered from the dehydrochlorination or cracking of ethylene dichloride to vinyl chloride, is recycled to an oxychlorination unit. The process further employs an oxygen-containing gas such as air or oxygen.

As a result of these processes, ethylene dichloride will often contain impurities such as iron complexes due to the catalyst and corrosion of process equipment and other organic chloride compounds and tars. Ethylene dichloride must be purified prior to its cracking to produce vinyl chloride monomer and the impurities formed during the production of ethylene chloride must be removed. The most common impurities in ethylene chloride include but are not limited to butadiene, chloroprene, vinylidene chloride, chlorinated methane, acetylene, and ethylene. This is typically accomplished with washing and distillation steps. However, after some usage the distillation and purification units begin to foul due to the accumulation of impurities. The deposition of these impurities, often polymeric in nature, result in less efficient economies of production as well as shut-down to clean the fouled unit.

SUMMARY OF THE INVENTION

Disclosed are methods and compositions for inhibiting fouling in vinyl monomers during their processing. It has been discovered that certain alkylphosphonate esters or acids thereof are effective at inhibiting fouling in vinyl monomer and chlorinated hydrocarbons.

DESCRIPTION OF THE RELATED ART

U.S. Pat. No. 5,240,469 teaches methods and compositions for preventing fouling of ethylene dichloride distillation units. The compositions comprise an oil-soluble polymethacrylate ester containing from 0.1 to 25 mole percent of amino alcohol groups, a phenylenediamine having at least one N—H bond, and a heavy aromatic solvent.

DETAILED DESCRIPTION OF THE INVENTION

The present invention relates to methods and compositions for inhibiting fouling in vinyl monomers during their processing comprising adding to the vinyl monomer an effective antifouling amount of an alkylphosphonate ester or acid thereof.

The alkylphosphonate esters or acids thereof useful in the present invention have the general structure:

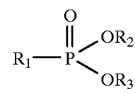

(I)

wherein $R_1$ is a $C_1$ to $C_{40}$ alkyl or alkenyl and $R_2$ and $R_3$ are either the same or different and are H or a substituted or non-substituted $C_1$ to $C_{40}$ alkyl or alkenyl radical.

In a preferred embodiment of the present invention, $R_1$ is a $C_4$ to $C_{30}$ alkyl radical and $R_2$ and $R_3$ are the same or different and are $C_1$ to $C_5$ alkyl radicals. In a more preferred embodiment, $R_1$ of Formula I is a $C_4$ to $C_{30}$ n-alkyl radical and $R_2$ and $R_3$ are the same or different and are $C_1$ to $C_2$ alkyl radicals.

The alkylphosphonate esters of the present invention may also be represented by the general structure:

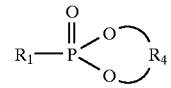

(II)

wherein $R_1$ is a $C_1$ to $C_{40}$ alkyl or alkenyl radical and $R_4$ is a substituted or non-substituted alkyl or alkenyl radical having 1 to 40 carbon atoms. In a preferred embodiment of Formula II, $R_1$ is a $C_4$ to $C_{30}$ alkyl radical and $R_4$ is a hydroxy substituted $C_2$ to $C_{10}$ alkyl radical In a more preferred embodiment of this invention, $R_1$ of Formula II is a $C_4$ to $C_{30}$ n-alkyl radical and $R_4$ is —CH$_2$CH—(CH$_2$OH) or —CH$_2$CHOHCH$_2$— or (—CH$_2$)$_2$C(CH$_2$OH)$_2$. $R_1$ is most preferably $C_{12}$ to $C_{18}$.

The alkylphosphonate esters of the present invention can be prepared by a number of synthetic methods known to those skilled in the art. For example, compounds of the present invention can be prepared by Michaelis-Arbuzov reaction of phosphites with halogenated materials, or by radical addition of phosphites with alkenes.

Preferably, the compounds of the present invention are prepared by radical addition of a dialkyl phosphite to an alkene to yield dialkyl alkylphosphonate esters represented by Formula I. These compounds can be further functionalized by transesterification with suitable reagents to those skilled in the art, to yield compositions represented by Formula I and Formula II. Exemplary compounds include but are not limited to pentaerythrisol and glycerol.

The radical addition of the dialkyl phosphite with the alkene may proceed in the presence of a free radical initiator either neat or in solution. Conventional initiators such as peroxides, azo compounds and UV light may be used. Exemplary dialkyl phosphite compounds include but are not limited to diethyl and dimethyl phosphite. Exemplary alkane compounds include but are not limited to $C_2$ to $C_{30}$ α olefins and mixtures thereof.

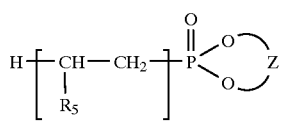

(III)

where $R_5$ is the residual after polymerization of a $C_2$ to $C_{30}$ α olefin, n is an integer greater than 1 and Z is a combination of $R_2$ and $R_3$, or $R_4$ as previously defined.

If desired, the reaction conditions utilized during the radical addition of dialkyl phosphite with the alkene can be modified to minimize the generation of polymeric species represented by Formula III. The non-polymeric reaction products can be readily recovered by known methods; however, it is feasible and economical to employ the compounds of the present invention without separation or purification for removal of these by-products.

For purposes of the present invention, the term "alkylphosphonate esters" is defined to include the acid version thereof.

It is to be understood that the phrase "vinyl monomers" as used herein signifies various and sundry petrochemicals possessing the vinyl grouping. Non-limiting examples include acrylates and diolefins, as well as, chlorinated hydrocarbons such as vinyl chloride monomer and ethylene dichloride. Other petrochemicals within the ambit of the present invention include olefin and naphthenic process streams, aromatic hydrocarbons and their derivatives and ethylene glycol.

The total amount of alkylphosphonate ester or acid thereof used in the methods of the present invention is that amount which is sufficient to inhibit polymerization and fouling and will vary according to the conditions under which the vinyl monomer is being processed and exposed to high temperatures. At higher processing temperatures and higher vinyl monomer contamination, larger amounts of the alkylphosphonate ester or acid thereof may be required.

For purposes of the present invention, the term "an effective antifouling amount" is defined as that amount of alkylphosphonate ester or acid thereof that will inhibit fouling of vinyl monomers. Preferably, this amount will range from about 10 parts to about 2,500 parts of alkylphosphonate ester or acid thereof per million parts of vinyl monomer. More preferably, this amount ranges from about 10 parts to about 1,000 parts per million parts or vinyl monomer.

The alkylphosphonate ester or acid thereof may be added to the vinyl monomer by an conventional method at any point along the processing system. They may be added to the processing system as either a dispersion or as a solution using a suitable liquid carrier or solvent. Preferably this solvent is selected from the group of mineral oils and heavy aromatic naphtha. Mineral oils are typically straight- and branched- chain paraffinic compounds; polycyclic and fused- ring saturated hydrocarbons based on cyclopentane and cyclohexane prototype ring structures, collectively known as naphthenes; and, aromatics, both mono and polynuclear, which are unsaturated ring structures.

The alkylphosphonate esters of the present invention are generally effective at the temperatures at which vinyl monomers are processed. For example, temperatures of 60° C. to 180° C. are often found in ethylene dichloride during its processing and the compounds of the present invention are particularly effective under these conditions.

The alkylphosphonate esters of the present invention may also be desirably employed in a multi-component treatment composition. The other components may comprise an antioxidant compound to inhibit oxygen-based polymerization; corrosion inhibiting compounds; and other antifoulant compounds.

The invention will now be described with reference to a number of specific examples which are to be regarded solely as illustrative of the compositions and methods of the present invention and should not be construed as limiting the scope thereof.

EXAMPLES

Samples from ethylene dichloride vacuum column bottoms were tested using the hot liquid process simulator (HLPS) apparatus. The HLPS consists of an electrically heated rod fixed within a tube with close annular clearance which performs as a heat exchanger. In the test the sample fluid is passed through the heat exchanger while maintaining the rod at a constant temperature. As fouling occurs on the rod, less heat is transferred to the fluid which results in a decrease in the process fluid outlet temperature, as well as, solids deposits on the rod which blocks the flow of the sample fluid. Antifoulant efficacy was measured by the time elapsed until flow was stopped due to complete blocking of the annular clearance.

500 mL of sample were employed with the appropriate treatment as designated. The system was closed and pressurized with nitrogen at 600 psi. Flow rate was set at 3 mL/min. The rod temperature was kept at 220° C. The results of this testing are presented in Tables I and II.

The treatment compositions were based on the inventive alkylphosphonate ester structure:

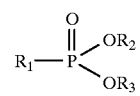

Table A defines the compositions that were tested.

TABLE A

| Treatment | $R_1$ | $R_2$ and $R_3$ |
|---|---|---|
| A | dodecyl | methyl |
| B | polyisobutylene (NW < 1200) | methyl |
| C | dodecyl | trimethylhexyl |
| D | dodecyl | glycerol |

TABLE I

HLPS test
EDC Vacuum column bottoms
Sample 1

| Run No. | Treatment | Dose (ppm) | Time to No Flow (min.) |
|---|---|---|---|
| 1 | Blank | — | 47 |
| 2 | Blank | — | 92 |
| 3 | Blank | — | 62 |
| 4 | A | 750 | 130+* |
| 5 | A | 200 | 141 |
| 6 | A | 200 | 140 |

*Run was discontinued at 130 minutes

As demonstrated in Table I, the inventive compound dodecyl phosphonate methyl ester proved effective at inhibiting fouling when compared against runs with no inhibitor treatment added. Further, testing results with a different bottoms sample are presented in Table II.

TABLE II

HLPS Test
EDC vacuum column bottoms
Sample 2

| Run No. | Treatment | Dose (ppm) | Time to No Flow (min.) |
|---------|-----------|------------|------------------------|
| 1 | Blank | — | 58 |
| 2 | Blank | — | 62 |
| 3 | A | 200 | 135* |
| 4 | B | 200 | 135* |
| 5 | C | 200 | 135* |
| 6 | D | 200 | 135* |

*Maximum run time was 135 minutes

As demonstrated in Table II, the inventive compounds were able to inhibit fouling for the entire length of the test run while those runs without inhibitor fouled in less than half the time.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. An antifouling composition comprising an alkylphosphonate ester or acid thereof having the formula:

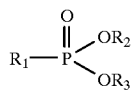

wherein $R_1$ is a $C_1$ to $C_{40}$ alkyl or alkenyl radical and $R_2$ and $R_3$ are either the same or different and are H or a substituted or non-substituted $C_1$ to $C_{40}$ alkyl or alkenyl radical and a vinyl monomer selected from the group consisting of acrylates, diolefins and chlorinated hydrocarbons wherein said alkylphosphonate ester or acid thereof is present in said vinyl monomer in an amount ranging from about 10 parts to about 2,500 parts per million parts of said vinyl monomer.

2. The composition as claimed in claim 1 wherein $R_1$ is $C_4$ to $C_{30}$ alkyl radical and $R_2$ and $R_3$ are the same or different and are $C_1$ to $C_5$ alkyl radicals.

3. The composition as claimed in claim 1 wherein $R_1$ is a $C_4$ to $C_{30}$ n-alkyl radical and $R_2$ and $R_3$ are the same or different and are $C_1$ to $C_2$ alkyl radicals.

4. The composition as claimed in claim 1 wherein said alkylphosphonate ester has the formula:

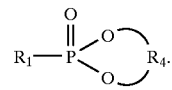

5. The composition as claimed in claim 4 wherein $R_1$ is a $C_4$ to $C_{30}$ alkyl radical and $R_4$ is a hydroxy substituted $C_2$ to $C_{10}$ alkyl radical.

6. The composition as claimed in claim 4 wherein $R_1$ is a $C_4$ to $C_{30}$ n-alkyl radical and $R_4$ is selected from the group consisting of —$CH_2CH$—($CH_2OH$), —$CH_2CHOHCH_2$—, and (—$CH_2$)$_2$ C($CH_2OH$)$_2$.

7. The composition as claimed in claim 1 wherein said chlorinated hydrocarbons are selected from the group consisting of vinyl chloride monomer and ethylene dichloride.

* * * * *